United States Patent
Blakeslee et al.

(10) Patent No.: US 9,149,825 B1
(45) Date of Patent: Oct. 6, 2015

(54) SPRINKLER SAVER AND GRASS KILLER DEVICE

(71) Applicant: Blakewood Enterprises, LLC, Cocoa, FL (US)

(72) Inventors: Randy J. Blakeslee, Cocoa, FL (US); Laura Woodell, Indialantic, FL (US)

(73) Assignee: Blakewood Enterprises, LLC, Cocoa, FL (US)

( * ) Notice: Subject to any disclaimer, the term of this patent is extended or adjusted under 35 U.S.C. 154(b) by 218 days.

(21) Appl. No.: 13/937,562

(22) Filed: Jul. 9, 2013

(51) Int. Cl.
*B05B 1/28* (2006.01)
*B05B 15/00* (2006.01)
*A01M 7/00* (2006.01)

(52) U.S. Cl.
CPC ............ *B05B 15/001* (2013.01); *A01M 7/0064* (2013.01)

(58) Field of Classification Search
CPC ........................... B05B 15/001; A01M 7/0064
USPC .............. 239/200, 201, 288.5, 203, 104, 279, 239/288
See application file for complete search history.

(56) References Cited

U.S. PATENT DOCUMENTS

| | | | |
|---|---|---|---|
| 2,080,341 A | 5/1937 | Schumacher | |
| 3,015,448 A | 1/1962 | Hurless | |
| D256,386 S | 8/1980 | Bergland | |
| 5,213,262 A * | 5/1993 | Violette | 239/203 |
| 5,772,118 A | 6/1998 | Fabiano | |
| 6,494,386 B1 * | 12/2002 | Banu | 239/288 |
| 7,216,819 B2 | 5/2007 | Bernards | |
| 7,946,507 B2 | 5/2011 | Gauthier, III | |
| 8,342,427 B1 * | 1/2013 | Jivanjee, Jr. | 239/310 |
| 2005/0224596 A1 * | 10/2005 | Panopoulos | 239/67 |
| 2009/0277974 A1 * | 11/2009 | Citrawireja et al. | 239/203 |

OTHER PUBLICATIONS

Sprinkler Saver, Welcome to Sprinkler Saver.com, retrieved from http://www.sprinklersaver.com/, retrieved on Jul. 2, 2013, 2 pages.

* cited by examiner

*Primary Examiner* — Len Tran
*Assistant Examiner* — Joel Zhou
(74) *Attorney, Agent, or Firm* — Brian S. Steinberger; Law Offices of Brian S. Steinberger, P.A.

(57) ABSTRACT

Devices, guards and shields and methods for both protecting sprinkler heads and preventing unwanted vegetation from growing adjacent to the sprinkler heads, which can be applied to most if not all sprinklers on the market. The novel devices, guards and shields can be formed from a two part (upper and bottom part sections) forming a housing with ring shape housing dry and/or liquid herbicides. The ring shape can have a large center hole for allowing the ring shape to be positioned over and about the sprinkler head. The ring shaped housing includes drainage openings through the top and bottom half sections for allowing water from the sprinkler or rain water to pass therethrough and onto a replaceable herbicide which can kill unwanted vegetation such as grass, weeds, roots, trees, from growing adjacent to the sprinkler head.

16 Claims, 7 Drawing Sheets

SPRINKLER SAVER AND GRASS KILLER DEVICE

FIELD OF INVENTION

This invention relates to sprinkler heads, and in particular to devices, guards and shields and methods for both protecting sprinkler heads and also deter grass and weeds from growing adjacent to the sprinkler heads, which can be applied to most if not all sprinkler heads available on the market, and also use a safe replaceable herbicide.

BACKGROUND AND PRIOR ART

Inground sprinkler heads are prone to becoming damaged from lawn mowers, walking traffic and vehicles. The undesirable impacts on the plastic head parts will often result in broken sprinkler heads that require repairs and often must be replaced. Such repairs and replacement of the sprinkler heads can be quite expensive on residential lawns that that have dozens of installed sprinkler heads. The problem is further compounded in commercial lawns and golf courses.

Another problem with sprinkler heads is that it can be expensive and time consuming to constantly trim unwanted vegetation such as grass and weeds from growing up around the sprinkler heads. The undesirable vegetation can result in obstructing the side spray from being emitted from the heads which limits the amount of ground cover to be sprayed from the sprinkler heads.

Often lawn maintenance workers will use mowers to try to cut the unwanted vegetation around the heads. However, the mowers can damage and destroy the sprinkler heads if they get too close. More often than not the mowers will not effectively cut the unwanted vegetation immediately around the sprinkler heads. Other types of popular tools have included edge trimmers and gas or electric power line trimmers. However, these tools can also easily damage or destroy the plastic parts on sprinkler heads. Another alternative is to have the lawn maintenance worker to physically pull the unwanted vegetation by hand. However, this technique can become quite expensive and time consuming per job.

Over the years various types of sprinkler head shields and guards have been proposed. See for example, U.S. Pat. No. 5,772,118 to Fabiano describes a sprinkler head shield that requires the shield to be screwed to the base of the sprinkler head, which would be time consuming to attach as well as not be able to be used with all the different types of the sprinkler heads on the market. Also, this shield does not deter or prevent unwanted vegetation from growing up adjacent to the sprinkler heads.

U.S. Pat. No. 2,080,341 to Schumacher; Des. 256,386 to Bergland; U.S. Pat. No. 7,216,819 to Bernards and U.S. Pat. No. 7,946,507 to Gauthier, III each show shields having generally disc shaped configurations with central holes for fitting about a sprinkler head. However, these shields do not deter or prevent unwanted vegetation from growing up adjacent to the sprinkler heads.

U.S. Pat. No. 3,015,448 to Hurless and the product SPRINKLER SAVER® each show devices having portions that must be inserted into the ground or snap about the neck portions around the sprinkler heads. However, these types of guards can require extra labor to have portions inserted into the ground, and cannot universally work with all the different types of sprinkler heads on the marks. Also, these guards do not deter or prevent unwanted vegetation from growing up adjacent to the sprinkler heads.

Other types of prior art guards and shields use donuts that can be made of plastic and/or concrete. However, these guards and shields cannot universally work with all the different types of sprinkler heads on the market. Also, these guards do not deter or prevent unwanted vegetation from growing up adjacent to the sprinkler heads.

Thus, the need exists for solutions to the above problems with the prior art.

SUMMARY OF THE INVENTION

A primary objective of the present invention is to provide devices, guards and shields and methods for both protecting sprinkler heads and deter unwanted vegetation from growing adjacent to the sprinkler heads, which can be applied to most if not all sprinkler heads available on the market.

A secondary objective of the present invention is to provide devices, guards and shields and methods for both protecting sprinkler heads and deter unwanted vegetation from growing adjacent to the sprinkler heads, having a replaceable safe herbicide.

A third objective of the present invention is to provide devices, guards and shields and methods for both protecting sprinkler heads and also deter unwanted vegetation from growing adjacent to the sprinkler heads, which can be applied to most if not all sprinkler heads available on the market.

A sprinkler head protector and grass killer device, can include a hollow ring shaped housing having an upper side and a lower side, with a large center hole therethrough, a herbicide for being placed inside of the housing, and drainage holes passing through the upper side and the lower side of the ring shaped housing, wherein the ring shaped housing can be placed about a sprinkler head, so that water passing through the drainage holes causes the herbicide inside of the ring shaped housing to leach onto ground surfaces adjacent to the sprinkler head to prevent unwanted grass from growing adjacent to the sprinkler head while the ring shaped housing protects sides of the sprinkler head.

The upper side can include a perimeter edge having an annular groove and the lower side includes a raised edge for fitting within the annular groove of the upper side.

The upper side can include a pair of concentric annular grooves, and the lower side includes a pair of raised annular edges for fitting within the annular grooves of the upper side.

The annular groove can have an outwardly protruding ledge, and the raised edge includes an outwardly protruding ledge, so that the outwardly protruding ledge on the upper side and the outwardly protruding ledge on the lower side abut against one another when the upper side and the lower side are attached to one another.

Both of the annular grooves can have an outwardly protruding ledge, and both of the raised edges have outwardly protruding ledges, so that the outwardly protruding ledges on the upper side and the outwardly protruding ledges on the lower side abut against each other when the upper side and the lower side are attached to one another.

The upper side and the lower side can snappably attach to one another to form the ring shape.

The upper side and the lower side can be sized to tightly attach to one another to form the ring shape.

The upper side and the lower side can be formed from molded plastic.

The herbicide can be a liquid form selected from at least one of: rock salt, cornmeal, and black walnut shells.

The herbicide can be a dry herbicide selected from at least one of chlorine and vinegar.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
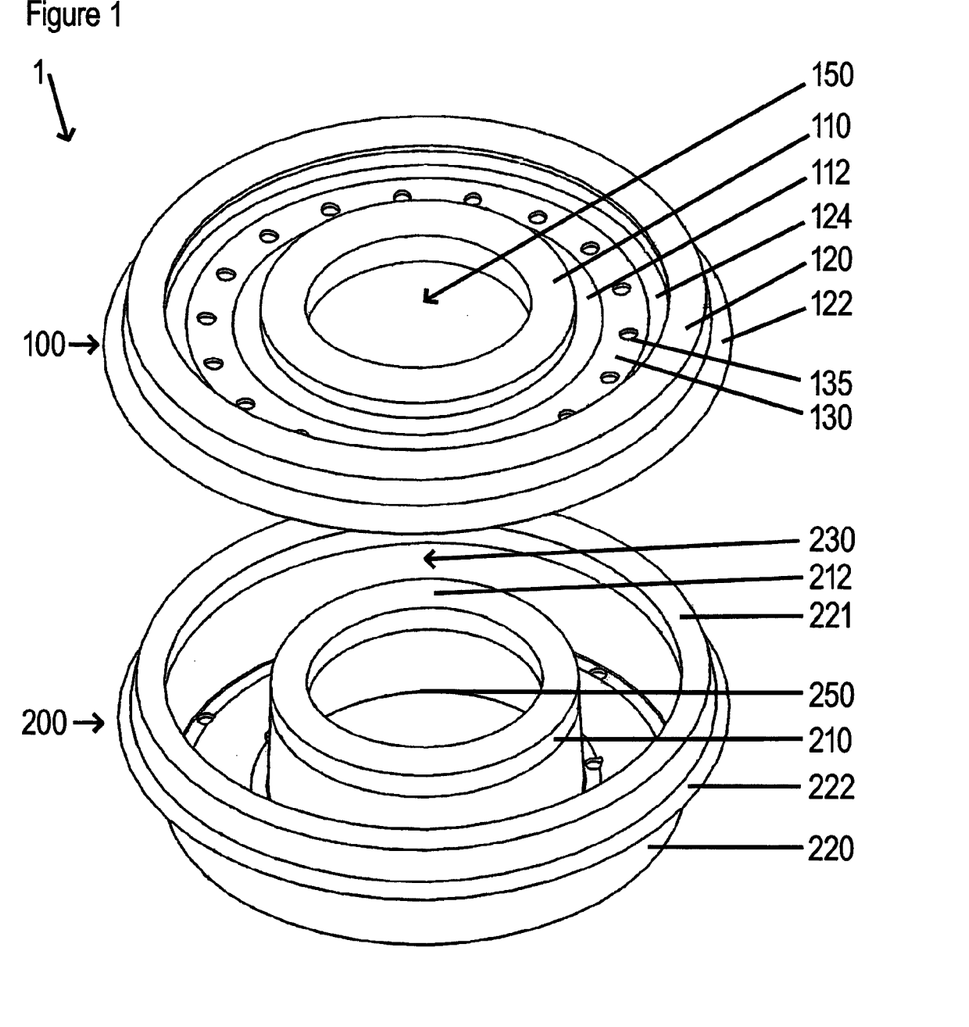
FIG. 1 is a perspective exploded upper view of the upper section and the lower section of the hollow ring shaped sprinkler head protector.
Figure 2:
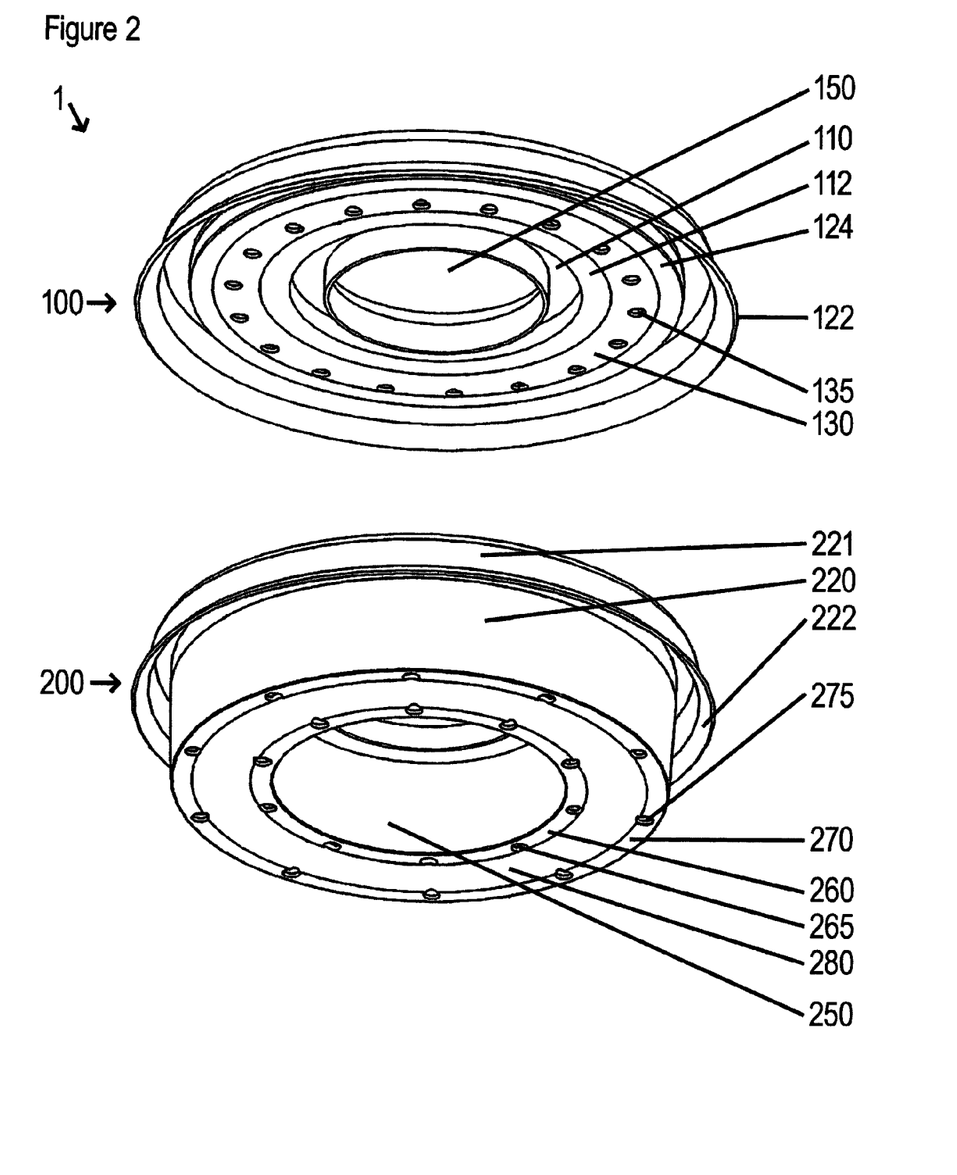
FIG. 2 is a perspective exploded bottom view of the upper section and the lower section of the hollow ring shaped sprinkler head protector.
Figure 3:
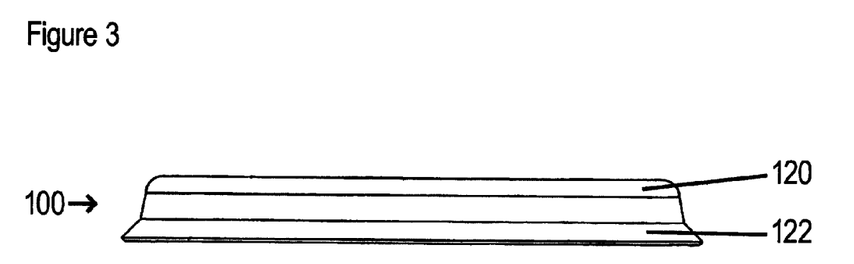
FIG. 3 is a side view of the upper section of the hollow ring shaped sprinkler head protector of FIGS. 1-2.
Figure 4:
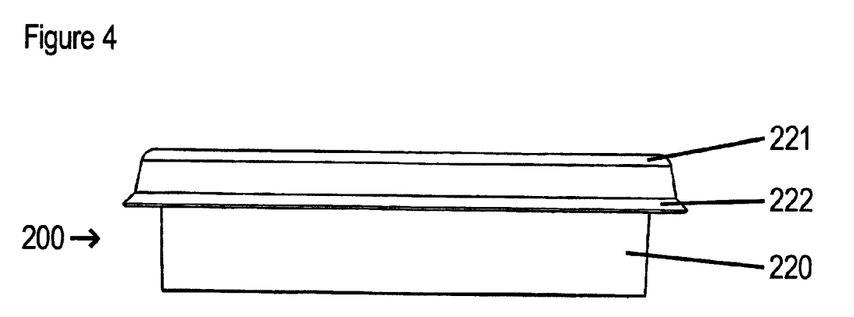
FIG. 4 is a side view of the lower section of the hollow ring shaped sprinkler head protector of FIGS. 1-2.

A list of components will now be described.
1 Sprinkler Head Protector
100 Upper section
110. First annular ring with bottom facing annular groove
112. First outwardly protruding ledge
120. Second annular ring with bottom facing annular groove (concentric with first annular groove)
122. Second outwardly protruding ledge
124. Inwardly protruding ledge from second annular ring
130. annular spacer between annular rings
135. drainage holes in annular spacer
150. central opening
200. Lower section
210. First upwardly extending inner annular ring with an inner wall and an outer wall
212. capped top of annular ring
220. Second upwardly extending outer annular ring with an inner wall and an outer wall
221. capped top of annular ring
222. outwardly protruding ledge extending outwardly from second annular ring wall
230. Annular channel formed between first annular ring 210 and second annular ring 220.
260. first annular groove in floor of annular channel
265. drainage holes in first groove
270. second annular groove in floor of annular channel
275. drainage holes in second groove
280. raised annular floor between first and second grooves
250. central opening
300. Ground
310. Vegetation
400. Sprinkler head
500. Herbicide FIG. 1 is a perspective exploded upper view of the upper section 100 and the lower section 200 of the hollow ring shaped sprinkler head protector 1. FIG. 2 is a perspective exploded bottom view of the upper section 100 and the lower section 200 of the hollow ring shaped sprinkler head protector 1. FIG. 3 is a side view of the upper section 100 of the hollow ring shaped sprinkler head protector 1 of FIGS. 1-2. FIG. 4 is a side view of the lower section 200 of the hollow ring shaped sprinkler head protector 1 of FIGS. 1-2.

Referring to FIGS. 1-3, the upper section 100, a first annular ring with bottom facing annular groove 110, a first outwardly protruding ledge 112, a second annular ring with bottom facing annular groove (concentric with first annular groove) 120, a second outwardly protruding ledge 122, and an inwardly protruding ledge 124 from second annular ring 120. A annular spacer 130 can be located between annular rings 110 and 120, and drainage holes 135 in the annular spacer 135. The upper section can also include a central opening 150.

Referring to FIGS. 1, 2 and 4, the lower section 200 can include a first upwardly extending inner annular ring 210 with an inner wall and an outer wall, and a capped top 212. A second upwardly extending outer annular ring 220 with an inner wall and an outer wall can be located outside the first annular ring 210, and have a capped top 221. An outwardly protruding ledge 222 can extend outwardly from second annular ring 220. A Annular channel 230 can be formed between first annular ring 210 and second annular ring 220. A first annular groove 260 can be located in the floor of the annular channel 230, with drainage holes 265 in the first groove 260. A second annular groove 270 can be located in the floor of annular channel 230 with drainage holes 275 in the second groove 270. A raised annular floor 280 can be located between the first groove 260 and the second groove 270. A central opening 250 can be down the middle of the lower section 200.

Figure 5:
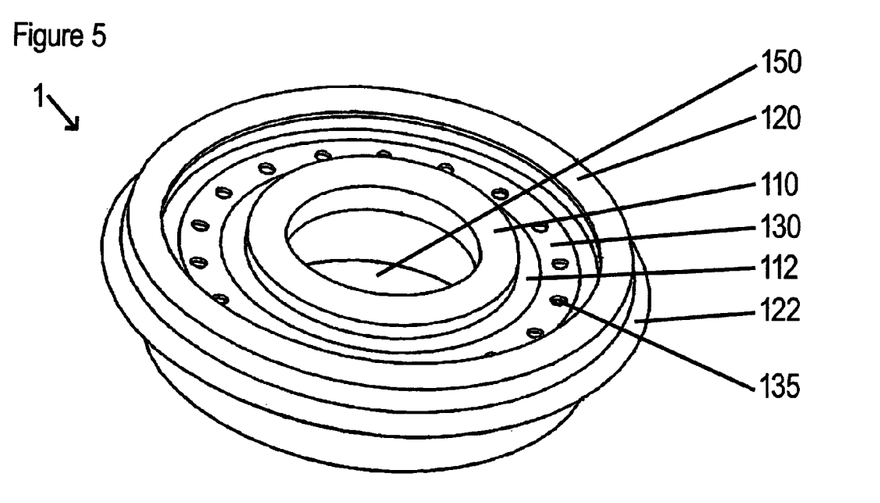
FIG. 5 is an upper perspective view of the upper section and the lower section of the preceding figures assembled into a hollow ring shaped protector.
Figure 6:
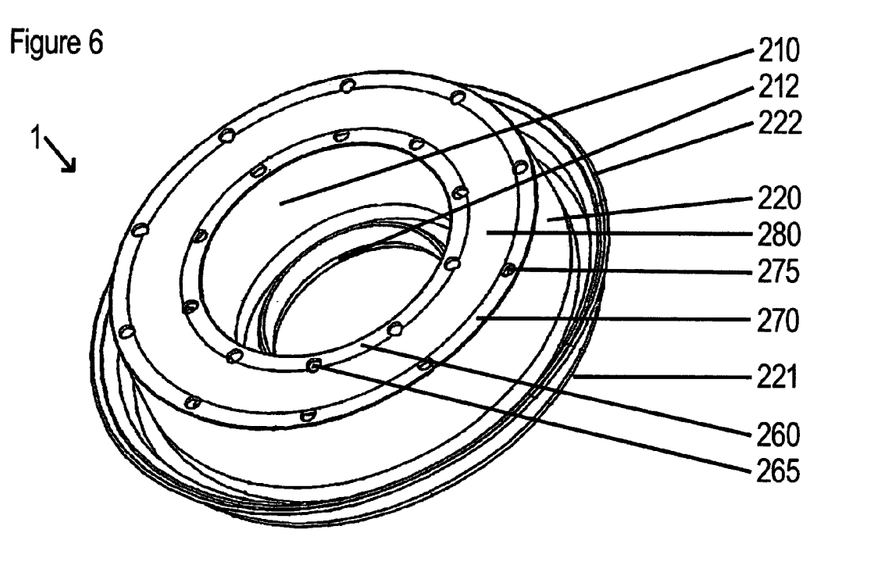
FIG. 6 is a lower perspective view of the assembled hollow ring shaped protector of FIG. 5.
Figure 7:
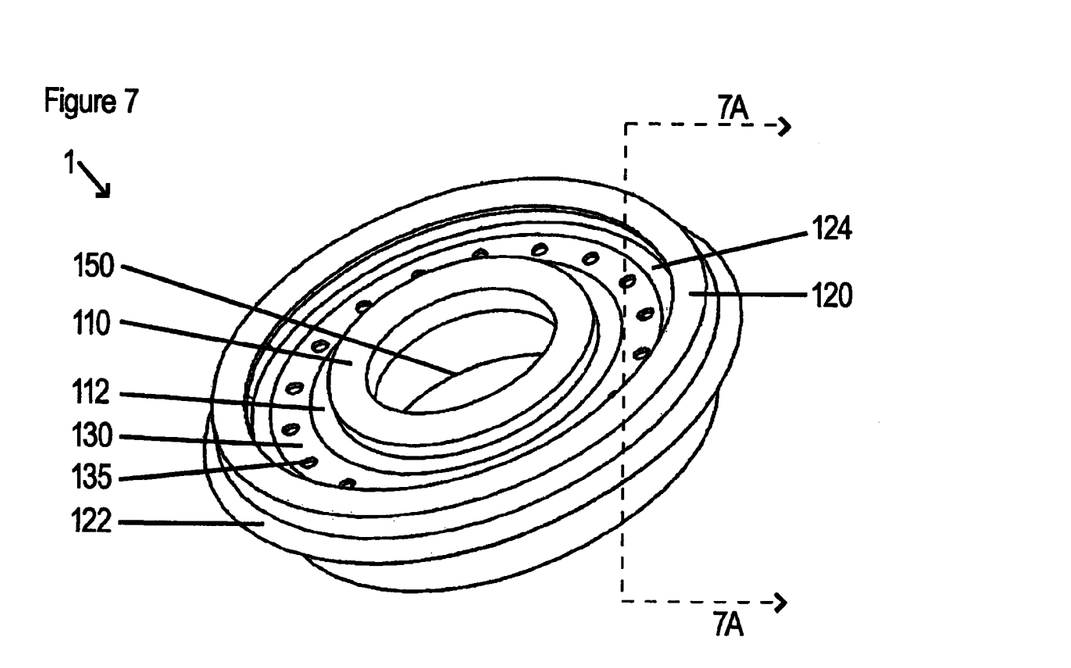
FIG. 7 is another upper perspective view of the assembled hollow ring shaped protector of FIG. 5.
Figure 7A:
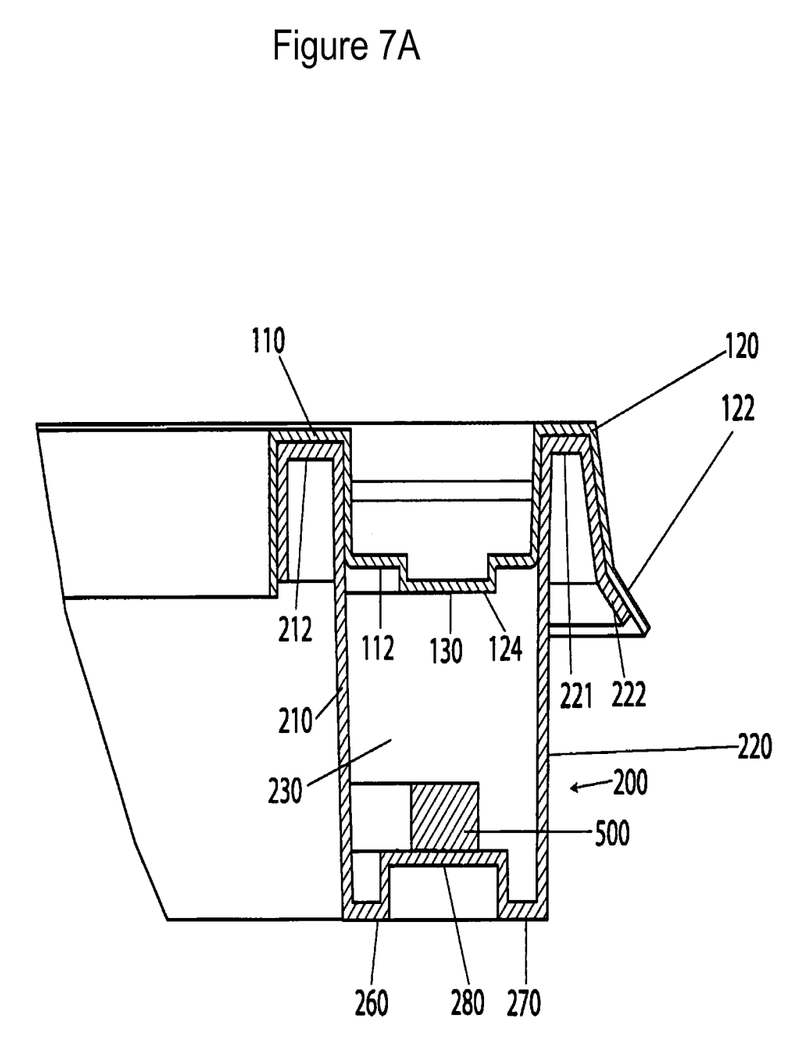
FIG. 7A is a partial cross-sectional view of the assembled hollow ring shaped protector of FIG. 7.
Figure 8:
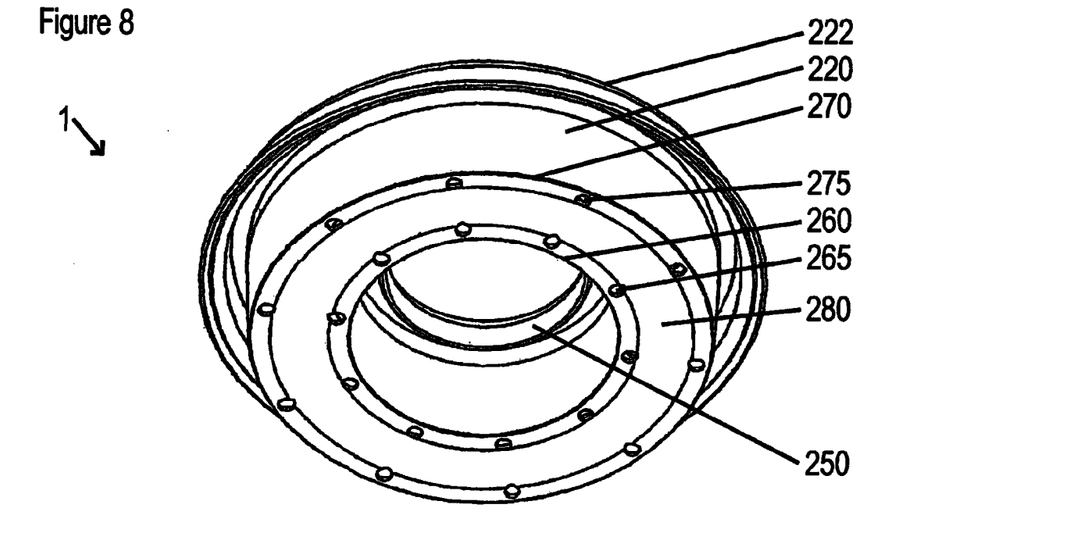
FIG. 8 is another lower perspective view of the assembled hollow ring shaped protector of FIG. 5.

FIG. 5 is an upper perspective view of the upper section 100 and the lower section 200 of the above figures assembled into a hollow ring shaped protector 1. FIG. 6 is a lower perspective view of the assembled hollow ring shaped protector 1 of FIG. 5. FIG. 7 is another upper perspective view of the assembled hollow ring shaped protector 1 of FIG. 5. FIG. 7A is a partial cross-sectional view of the assembled hollow ring shaped protector 1 of FIG. 7. FIG. 8 is another lower perspective view of the assembled hollow ring shaped protector 1 of FIG. 5.

Referring to FIGS. 1-8, the user can place a herbicide 500 (shown in FIG. 7A) on the raised annular floor 280 in the annular channel 230 of the lower section 200. The herbicide 500 can include but is not limited to dry materials such as but not limited to rock salt, cornmeal, and black walnut shells, and the like. Alternatively, the floor portion 280 can have an indentation for holding liquid herbicides, such as but not limited to chlorine, and vinegar, and the like.

Referring to FIGS. 1-8, the upper section 100 and the lower section 200 are assembled together into a single protector 1, by pushing together the upper section 100 over the lower section 200. The bottom facing annular grooves of the first and second annular rings 110, 120 are positioned over the capped tops 212, 221 of the first upwardly extending annular ring 210 and the second upwardly extending annular ring 220 of the lower section 200. The tight fit between the upper section 100 and the lower section allows for the portions of the upper section 100 and the lower section to be sandwiched together and abutting one another as shown by outwardly protruding ledge 122 or upper section 100 contacting against outwardly protruding ledge 222 of the lower section 200. The upper section 100 and lower section are sized so that the sections 100, 200 tightly fit with each other when pushed together.

Figure 9:
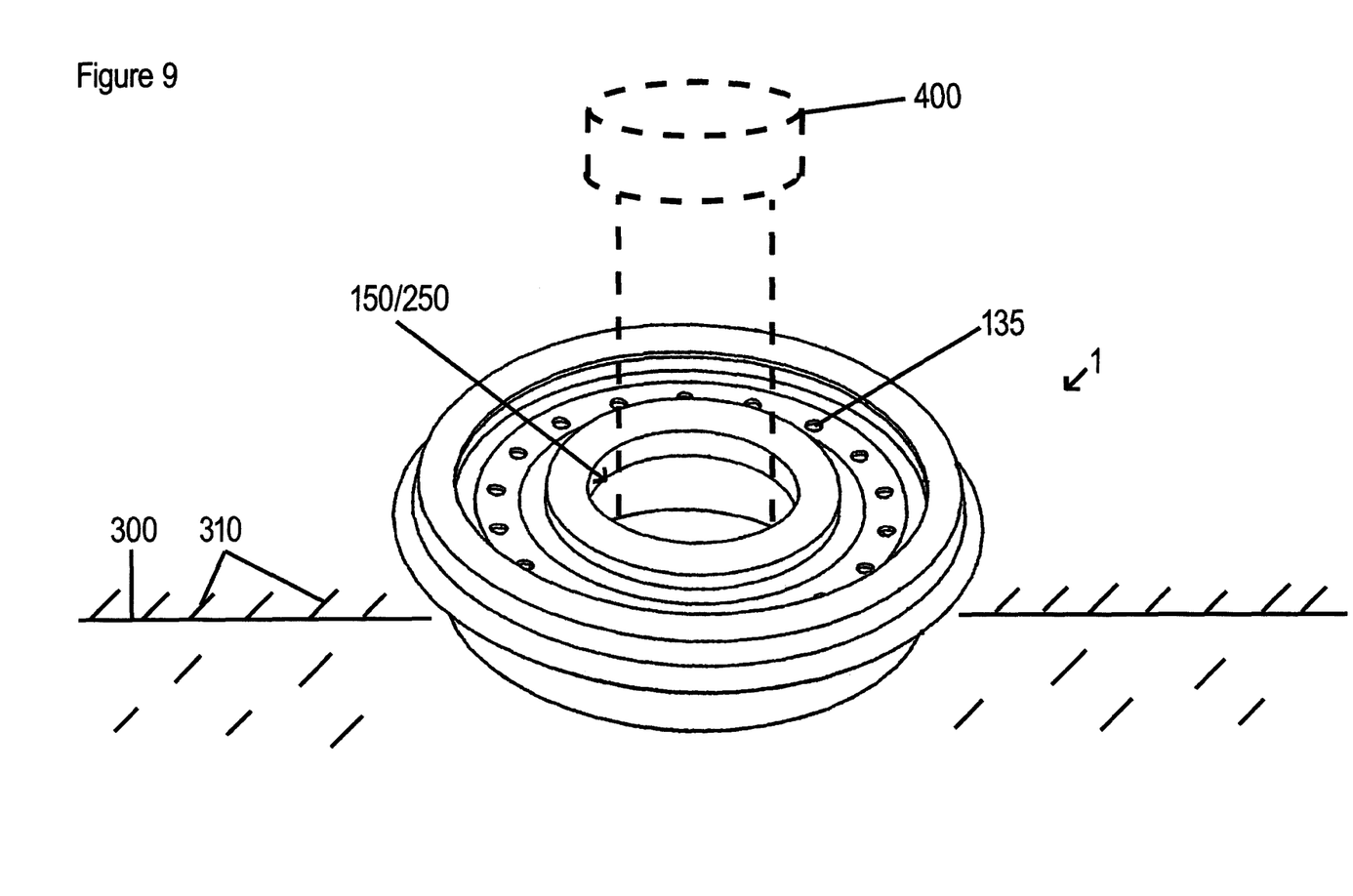
FIG. 9 shows the assembled hollow ring shaped protector of FIGS. 5-8 for protecting a sprinkler head and deterring unwanted vegetation growing adjacent the sprinkler head.

FIG. 9 shows the assembled hollow ring shaped protector 1 of FIGS. 5-8 for protecting a sprinkler head 400 and deterring unwanted vegetation 310 growing adjacent the sprinkler head.

Referring to FIGS. 1-9, the assembled protector 1 with herbicide 500 is placed over the sprinkler head 400 of an underground sprinkler. The novel protector 1 only has to be placed on the ground surface 300 and is not required to be dug into the ground surface 300.

Water from the sprinkler head 400 and/or rainwater can pass through the drainage holes 135 in the upper section 100 and into the annular channel 230 in the lower section 200 to cause portions of the herbicide 500 to drain out of drainage holes 265, 275 in the lower section onto the ground 300. The water coming from running off the herbicide 500 then kills unwanted vegetation, such as but not limited to grass, weeds, trees, roots, shrubs and any other growths from naturally growing up and obstructing sprinkler head 400.

Other types of attachments can be used besides raised ridges snapping into annular grooves. For example, snapable edges can snap into each other.

Embodiments can have donut shapes with an outer diameter of approximately five inches and an inner diameter of the central opening of approximately 2 inches. Larger sizes can include outer diameters of approximately 8.9 inches and central opening diameters of approximately 3.250 inches. The height can be approximately 1 to approximately inches. The term approximately can include +/−10%. Other sizes and dimensions can be used as needed.

While the preferred embodiment shows a generally ring shaped housing, the housing can have other geometrical shapes, such as but not limited to rectangular, square, triangular, hexagon, and other shapes and the like.

Although the upper section is shown having a generally plate shape and the lower section has a large annular channel for receiving the herbicide, the upper section and the lower section can be reversed.

While herbicides have been described, the invention can be used with other insertable materials, such as but not limited to insecticides, and the like, for killing undesirable insects, such as red ants, cockroaches, spiders, mosquitoes, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A sprinkler head protector and grass killer device, comprising:

a hollow double ring shaped housing having an upper section and a lower section, with a large center hole through the upper section and the lower section;

the upper section having an inner ring inside of an outer ring, with an annular grooved surface between a lower end of the inner ring and a lower end of the outer ring;

the lower section having an inner ring inside of an outer ring, the inner ring of the lower section having a top end for abutting against an underside portion of the inner ring of the upper section, the outer ring of the lower section having a top end for abutting against an underside portion of the outer ring of the upper section, with a floor surface between a lower end of the inner ring and a lower end of the outer ring, the inner ring of the upper section having a diameter being substantially identical to a diameter of the inner ring of the lower section, the outer ring of the upper section having a diameter being substantially identical to a diameter of the outer ring of the lower section;

a hollow annular chamber formed between the upper section and the lower section with a top of the annular chamber being the annular grooved surface in the upper section, and a bottom of the annular chamber being the floor surface in the lower section;

a herbicide for being placed inside of the hollow annular chamber of the housing;

drainage holes in the annular grooved surface in the upper section; and drainage holes in the floor surface of the lower section, wherein the double ring shaped housing is adapted to be placed about a sprinkler head, so water passing through the drainage holes in both the annular grooved surface of the upper chamber and the drainage holes in the floor surface of the lower section causes the herbicide inside of the hollow annular chamber to leach onto ground surfaces adjacent to the sprinkler head to prevent unwanted grass from growing adjacent to the sprinkler head while the double ring shaped housing protects sides of the sprinkler head.

2. The sprinkler head protector and grass killer device of claim 1, wherein the upper section and the lower section snappably attach to one another to form the ring shape.

3. The sprinkler head protector and grass killer device of claim 1, wherein the upper section and the lower section are sized to tightly attach to one another to form the ring shape.

4. The sprinkler head protector and grass killer device of claim 1, wherein the upper section and the lower section are formed from molded plastic.

5. The sprinkler head protector and grass killer device of claim 1, wherein the herbicide is a liquid herbicide.

6. The sprinkler head protector and grass killer device of claim 1, wherein the herbicide is a dry herbicide.

7. The sprinkler head protector and grass killer device of claim 1, wherein the herbicide is selected from at least one of: rock salt, cornmeal, and black walnut shells.

8. The sprinkler head protector and grass killer device of claim 1, wherein the herbicide is selected from at least one of: chlorine and vinegar.

9. A two part sprinkler head protector, comprising:

an upper section having an inner ring inside of an outer ring with an annular grooved surface between the inner ring and the outer ring; and a lower section having an inner ring inside of an outer ring with a floor surface between a lower end of the inner ring and a lower end of the outer ring, wherein the upper section attaches to the lower section to form a hollow annular shaped channel therebetween, with a center opening passing through both the upper section and the lower section for allowing the protector to fit over and about a raised sprinkler head;

drainage holes in both the annular grooved surface of the upper section and the floor section of the lower section; and an herbicide for being positioned inside the hollow annular shaped channel for leaching into ground underneath the protector when water passes through the drainage holes in both the annular grooved surface of the upper section and the floor surface of the lower section.

10. The two part sprinkler head protector of claim 9, wherein the upper section and the lower section are formed from molded plastic.

11. The sprinkler head protector and grass killer device of claim 1, wherein the inner ring and the outer ring of the upper section each have a top end at a substantially same height with each other.

12. The sprinkler head protector and grass killer device of claim 1, wherein the inner ring and the outer ring of the upper section each have a flat top surface.

13. The sprinkler head protector and grass killer device of claim 1, wherein the floor surface of the lower section includes a pair of annular grooves with one inside of another, with the drainage holes in the lower section being through the pair of annular grooves.

14. The two part sprinkler head protector of claim 9, wherein the inner ring and the outer ring of the upper section each have a top end at a substantially same height with each other.

15. The two part sprinkler head protector of claim 9, wherein the inner ring and the outer ring of the upper section each have a flat top surface.

16. The two part sprinkler head protector of claim 9, wherein the floor surface of the lower section includes a pair of annular grooves with one inside of another, with the drainage holes in the lower section being through the pair of annular grooves.

* * * * *